United States Patent [19]
Wilson

[11] Patent Number: 6,160,993
[45] Date of Patent: *Dec. 12, 2000

[54] METHOD AND APPARATUS FOR COMMAND AND CONTROL OF REMOTE SYSTEMS USING LOW EARTH ORBIT SATELLITE COMMUNICATIONS

[75] Inventor: John Bryan Wilson, Lawrenceville, Ga.

[73] Assignee: Scientific-Atlanta, Inc., Norcross, Ga.

[ * ] Notice: This patent issued on a continued prosecution application filed under 37 CFR 1.53(d), and is subject to the twenty year patent term provisions of 35 U.S.C. 154(a)(2).

[21] Appl. No.: 08/604,784

[22] Filed: Feb. 23, 1996

[51] Int. Cl.$^7$ .......................... H04B 7/185; H04B 17/00; H04Q 7/20
[52] U.S. Cl. ........................ 455/12.1; 455/67.1; 455/427
[58] Field of Search .................................. 455/8, 9, 12.1, 455/13.1, 13.3, 13.4, 67.1, 67.7, 127, 427, 430; 379/59

[56] References Cited

U.S. PATENT DOCUMENTS

| | | |
|---|---|---|
| 4,945,410 | 7/1990 | Walling . |
| 4,964,065 | 10/1990 | Hicks et al. ............................ 455/67.7 |
| 5,036,389 | 7/1991 | Morales . |
| 5,101,267 | 3/1992 | Morales-Garza . |
| 5,151,782 | 9/1992 | Ferraro . |
| 5,177,604 | 1/1993 | Martinez . |
| 5,223,923 | 6/1993 | Morales-Garza . |
| 5,257,099 | 10/1993 | Morales-Garze . |
| 5,291,554 | 3/1994 | Morales . |
| 5,329,590 | 7/1994 | Pond . |
| 5,357,276 | 10/1994 | Haave et al. . |
| 5,369,779 | 11/1994 | Moreland . |
| 5,448,623 | 9/1995 | Wiedeman et al. ..................... 455/12.1 |
| 5,594,740 | 1/1997 | LaDue ....................................... 379/59 |

*Primary Examiner*—Howard Britton
*Attorney, Agent, or Firm*—Kenneth M. Massaroni; Kelly A. Gardner; Hubert J. Barnhardt, III

[57] ABSTRACT

A method and apparatus for providing command and control of remote systems using low earth orbit satellite communications is disclosed. According to the present invention, a programmable transceiver apparatus provides a two-way communications path between a remote user and a control center via a low earth orbit satellite at frequencies below 1 GHz. The transceiver apparatus includes a transceiver for communicating with the low earth orbit satellite; an antenna coupled to the transceiver; at least one interface communicating signals between at least one external device located at the remote user, wherein the transceiver apparatus is programmed to transmit data related to the external device to the satellite in response to a signal communicated to the transceiver via the low earth orbit satellite, an internal program of the transceiver or an alarm or exception signal generated by any of the external devices or the user. According to another embodiment of the present invention, the command signals from the control center are embedded in an information signal of a direct-to-home subscription information system signal via a geostationary satellite operating at frequencies greater than 1 GHz, and are separated at the user location and communicated to the programmable transceiver. The transceiver, in turn, selectively communicates the command signal to the devices and receives data from the devices. The received data is then transmitted to the control center via a low earth orbit satellite.

17 Claims, 12 Drawing Sheets

METHOD AND APPARATUS FOR COMMAND AND CONTROL OF REMOTE SYSTEMS USING LOW EARTH ORBIT SATELLITE COMMUNICATIONS

CROSS-REFERENCE TO RELATED APPLICATIONS

This application is related to U.S. patent application Ser. No. 08/390,461, to J. Graham Mobley and Macy W. Summiro, entitled "Method and Apparatus for Using Satellites for Reverse Path Communication in Direct-to-Home Subscription Information Systems," filed Feb. 24, 1994 and to U.S. patent application Ser. No. 08/ to J. B. Wilson, Ray Lewis and Jason Funderburk, entitled "Antenna Apparatus and Method in Satellite Reverse-Path Communications in Direct-to-Home Subscription Information Systems," filed concurrently herewith. The disclosures of related U.S. Pat. Ser. Nos. 08/390,461 and 08/ are both assigned to Scientific Atlanta, the assignee of the present application, and are herein incorporated by reference, in their entireties.

FIELD OF THE INVENTION

The present invention relates generally to the use of little low earth orbit (LLEO) satellites for providing command and control of difficult-to-access and remotely located systems. In an exemplary embodiment, the present invention is directed to providing energy management services via a LLEO satellite network for remotely located residential, commercial and industrial utility subscribers where communication via telephone lines, cable, land-based communications systems, and the like, is either physically or economically impractical.

BACKGROUND OF THE INVENTION

Conventionally, providers of consumer services, such as, for example, utilities (i.e., gas and electricity), and the like, have been required to send a service representative to a consumer location in order to monitor service usage and to update the services required by the consumer when requested. This task is extremely labor intensive and costly. A possible alternative to conventional command, control and communication methods used by service providers could be a system that uses a modem in conjunction with existing telephone or cable infrastructure to accomplish certain functions, such as service selection and monitoring. However, there are many disadvantages attendant with such systems. For example, in many international locations, a telephone network is not a practical solution due to the lack of availability or access, or consumer concerns related to the cost associated with such a system. Another disadvantage associated with using telephone or cable infrastructure is that in most areas, cable or telephone infrastructures do not exactly overlay the same region as a given service provider. This is especially true in cases where the service provider, is covering a large national or international region. Moreover, in remote or difficult-to-access areas it may be impractical or even impossible to provide a land-based infrastructure, such as telephone lines or cable. Other alternatives have also been considered, however, these systems also suffer serious drawbacks due to their dependence on terrestrial infrastructure. For example, cellular networks and dedicated RF systems have been contemplated. However, these systems may require the incorporation of additional terrestrial infrastructure and do not always provide complete coverage, especially for remote and difficult-to-access areas. Thus, these systems suffer many of the same shortcomings as conventional telephone and cable systems.

In 1990, the United States Federal Communications Commission allocated spectrum in the VHF and UHF bands for Non-Voice, Non-Geosynchronous Mobile Satellite Services (NVNG-MSS). At the World Administrative Radio Conference in 1992, certain frequencies were allocated on a worldwide primary shared basis for the new NVNG-MSS. In particular, the 137–138 MHz, 148–150.05 MHz and 400.15–401 MHz frequency bands, all of which fall below 1 GHz, were allocated. The United States Federal Communications Commission, in its Report and Order, released in November, 1993, modified these frequency allocations slightly to comprise the bands 137–138 MHz and 400.15–401 MHz for space-to-Earth communications and 148–150.05 MHz and 399.9–400.05 MHz for Earth-to-space communications.

In connection with the allocation of transmission frequencies, the term "little" low earth orbit satellite (LLEO) system was originated. Low earth orbit (LEO) satellites are also contemplated for application at frequencies above 1 GHz, such as the so-called Iridium system, and these satellites have been named "big" low earth orbit satellites. Hence, the term "little" LEO satellite systems generally refers to systems in which radio transmission frequencies below 1 GHz have been allocated.

Geostationary satellites have been utilized for a number of years to provide intercontinental telecommunications services. A geostationary satellite is positioned so as to revolve around the earth at a speed equal to that of the rotation of the earth and at such a distance as to not: escape the earth's gravitational field; eventually drift toward the earth; or substantially move relative to its position with respect to the earth's surface. Thus, a geostationary satellite does not move relative to any position within its reach such that a receive/transmit antenna would need to "track" or move to follow the satellite's movement in order to achieve acceptable signal transmission or reception. The geostationary, or "Clarke," orbit is at 35,786 kilometers, or 22,247 miles above the surface of the earth. This distance requires a two-way time delay, at the speed of light, in the range of tenths of seconds to traverse. Geostationary satellites have proven extremely useful for wideband one-way communication signals, such as, for example, television signals, where absolute delay is not a problem.

The newly proposed LEO satellites for NVNG-MSS service will not suffer from the difficulty of real-time delay because LEOs are positioned much closer to the earth than geostationary satellites. For example, LEO satellites may be positioned in polar, north-south orbits at distances from 250 km to 1500 km from the earth's surface. These orbits may be inclined or not. An area of the surface of the earth covered by a particular satellite is generally referred to as the satellite's "footprint." Due to their proximity to the earth, LEO satellite footprints are generally smaller than those of geostationary satellites at the same power level. Referring to FIG. 1, there are shown sample "visibility" footprints for LEO satellites at 250 km and 750 km, assuming the satellite is standing still relative to the earth's surface. FIG. 1 is taken from the paper "Introduction of LEO Satellites Below 1 GHz Sharing in the Uplink Band," Technical Report RP 328 (Issue 2), by K. Brown, September, 1992, the disclosure of which is herein incorporated by reference in its entirety. In actuality, the LEO satellites will be moving north-to-south in one pass of the North American continent and south-to-north in a second pass. Their passes will cover different footprints with each pass as the earth rotates beneath them. As another consequence of their proximity to the earth, LEO satellites travel at such speeds, relative to that of the earth, that their footprints may be traversed within periods as short as, or shorter than, thirty minutes, depending upon their altitudes.

The first LEO communications satellite, known as Telstar, was only capable of providing communication between Europe and the United States during a thirty-six minute window during which its footprint was visible from both sides of the Atlantic Ocean. Short footprint durations have led to a move away from what are seen as the disadvantageous LEOs and toward geostationary orbit satellites which provide twenty-four hour service in its footprint. However, LEOs remain of interest due to the increasing need for relatively narrow-band, i.e., slow speed, non-voice data communications.

Little LEO satellite systems are optimally suited for handling bursty low data rate messages, typically in the range of 6–256 bytes, with the system being optimized for small amounts of data, i.e., not voice or video. LLEO systems generally employ a packet switched system that is inherently more efficient than a switched circuit network. Big LEOs are examples of systems that use switched circuit networks.

LLEO satellites are constantly circling the earth. Orbcomm and Starsys are two companies that are currently in the process of obtaining U.S. Federal Communications Commission licenses for operating LLEO satellites. Each of these companies intends to put up a constellation of LLEO satellites (24 for Starsys and 36 for Orbcomm) which will be placed in inclined polar orbits. Groups of satellites will be separated into different planes and equally spaced to provide constant coverage of the earth. For example, once the Orbcomm system is fully deployed, there will be constant real-time coverage of the entire globe. In fact, three satellites will always be in view at any given time at any given ground location. Referring briefly to FIG. 2, a representative coverage of twenty-four LEO satellites at a given time is shown. This figure is taken from Starsys Global Positioning, Inc.'s amended application to the U.S. Federal Communications Commission. From FIG. 2 it can be seen that virtually the entire earth's surface may be covered by twenty-four satellites. Moreover, according to one of Starsys' own charts, shown herein at FIG. 3, depending on the latitude, twenty-four LEO satellites will, in fact, predictably cover 100% of the earth's surface. In other words, one satellite or another will be visible from forty-eight degrees latitude 100% of the time. Similarly, Orbcomm's system using thirty-six LEO satellites will provide coverage wherein at least three satellites are visible to any given area 100% of the time. The ability to realize real-time coverage facilitates a wide variety of functions for systems that use LLEOs.

Each LLEO system currently contemplated can operate in two primary modes: real-time, so-called "bent pipe"; or store and forward. Bent pipe mode means that for mobile transceivers and Earth stations concurrently within the satellite's footprint, data communication can occur directly from the mobile transceiver to the Earth station gateway. In other words, operation in bent pipe mode requires that the satellite antenna footprint be capable of "seeing" both the transceiver and the Earth station at the same time. Because the antenna footprint of LLEO satellites are several thousand miles in diameter, most regions of the United States will be able to operate in bent pipe mode, thereby operating in virtual real-time. Store and forward services means providing the satellite with data storage memories for storing data received from mobile transceivers for later transmission to an Earth station as the satellite moves from the footprint in which the mobile transceiver is located to one in which the desired Earth station is located.

While LEO satellite systems are contemplated, their utilization for various applications is still in the exploratory stages of development. There remains a need, notwithstanding prior ground-based systems, such as, for example, telephone and cable, for an efficient, reliable path for exchanging data, command and control signals between a consumer and a supplier of services, especially in remote and difficult-to-access areas.

SUMMARY OF THE INVENTION

In general, the deficiencies of the prior art systems for providing command, control, communication and monitoring services to customers residing in remote or difficult-to-access areas are overcome by the principles of the present method and apparatus for providing a two-way communications path between a remote user and a control center via a low earth orbit (LEO) satellite at frequencies below 1 GHz. In particular, the present invention involves using LEO satellites to relay signals from a control center, operated by a service provider, to a consumer of the services. A transceiver located at the consumer site provides a communications interface capability for a variety of monitoring and control devices which are integrated into the consumer's system. In this manner, the service provider may monitor service usage by the consumer and command various devices to report information or to operate in a manner consistent with the provider's and/or consumer's requirements. Because of the virtually complete global coverage to be provided by LLEO satellites in the near future, real-time communications between the control center and the remotely located consumer is not only made possible, but is practical as well, regardless of the location of either the provider or the consumer. Moreover, the present invention alleviates the requirement of relying on land-based infrastructure that is subject to incomplete coverage, especially in remote and difficult-to-access areas, and outages due to weather and other interference, i.e., accidental cutting by construction workers, natural disasters, etc. Additionally, using existing LLEO satellite networks eliminates the need for providing additional infrastructure to realize the benefits of the present invention.

According to an embodiment of the present invention, a transceiver is provided that serves as an interface between a control center and the various devices located at the remote site. In this embodiment, signals are generated at the control center and are communicated to the transceiver via a LLEO satellite. It is understood that a LLEO network provider may require that the control center communicate the messages to a LLEO processing center which, in turn, transmits the messages to the appropriate LEO via an earth station. The transceiver relays the messages received from the LLEO satellite to the appropriate devices in accordance with address data, or the like, contained in the control center message. For example, the transceiver may broadcast a message to all devices to which it is interfaced. Alternatively, the control center message may be addressed to a single device, such as, for example, an automated meter reader, to access usage information requested by the control center. Many alternative addressing schemes may be realized in accordance with the present invention by manipulating the message sent by the control center.

The transceiver may also be programmable to transmit predetermined information from a predefined set of devices to the control center at predetermined time intervals. For example, meter reads may be programmed in advance for a particular day of the month which corresponds to a billing date. In this mode, the program of the transceiver will poll the automated meter reader at the given time and date, and transmit this information to the control center without receiving a command to do so from the control center. It will be appreciated that numerous automatic modes may be programmed into the transceiver depending upon the requirements of the control center.

In another embodiment, the transceiver may be provided with a memory that stores predetermined data from various devices for archival transmission to the control center upon receipt of a command from the control center or at a predetermined time based on a program of the transceiver. It is also contemplated that the control center will be able to provide signals to remotely program the transceiver itself. This feature of the present invention allows the control center to alter or reprogram the transceiver depending upon the requirements of the control center.

Additionally, the transceiver may relay commands from the control center that control operational features of certain devices that are in communication with the transceiver. For example, an automatic thermostat may have its settings adjusted via commands from the control center. Service connect and disconnect commands could also be initiated by the control center.

Yet another advantage of the present invention is that the transceiver may be programmed to automatically monitor and report power outages or unusual service conditions, and relay this information to the control center for investigation by the service provider. The transceiver may also be equipped to monitor consumer service usage or to provide testing and resetting of usage parameters. Alarm conditions or exception condition signals may also be used to initiate contact with the control center via the transceiver. An alarm signal from a user security system may initiate a communication to the control center which, in turn, may take the appropriate response. An added convenience to the user is the provision for a user initiated exception condition signal. The user may request service or information from the control center by initiating communication via an exception condition signal.

In another embodiment of the present invention, the transceiver is coupled to a gateway. The gateway provides a local connection for a large number of consumers located in the same general area, such as, for example, a number of businesses sharing a common building. Using a gateway to relay messages between the user devices and the transceiver provides numerous advantages, especially in commercial environments. For example, a message may be initiated by the control center for communication to all devices for a particular user. Rather than broadcast the signal to all users and all devices connected to the gateway, the gateway can be commanded by the control center to process the message to be broadcast to all devices of a selected user or users. Similarly, if all meters are to be read, the gateway can accommodate messaging of a certain type of device for all users. Because a gateway, by its very nature, has independent processing capability, achieving implementation of variable addressing modes will be relatively uncomplicated. A gateway may also serve to store data from various devices and to provide historical, or audit, data related to particular devices and/or users and can download this information to the control center via the transceiver on demand. Another advantage of using a gateway may be realized when using it to provide an interface to appliances or other power consuming systems of the consumer via any number of well known interfaces that may be accommodated by the gateway.

The system of the present invention may also be used to provide a "hot backup" capability for users that are presently using broadband cable or cellular networks as their primary communications path. This feature is particularly useful in the event of natural or man-made disasters which result in interruption of the communications path, such as, for example, downed lines due to storms or earthquakes or unintentionally cut cables. The system may be programmed to monitor the primary communications path and, upon detection of a discontinuity or other failure, immediately begin operation in the backup mode.

Another application of the present invention would be in a hand-held messaging device, for example, a laptop computer or integrated e-mail terminal. These hand-held units may be used by authorized personnel to access data from the user database anywhere in a given region via a transceiver attached thereto. These devices permit keyboard data and command entry and use LCD displays to retrieve and review customer data when in the field without the need for interfacing with local telephone or cable company infrastructure. This feature is especially useful in remote areas where telephone, cable and cellular service are not available.

In another embodiment of the present invention, users that are connected to a direct-to-home (DTH) information subscription service, such as, for example, direct-broadcast-satellite (DBS) television services, may receive large amounts of data from the control center related to controlling and commanding the utility system via the DBS system, while the LLEO transceiver acts to disseminate the information to individual devices and to provide a return path to the control center. It is well known that current DBS systems use geostationary satellites that cover entire continents in their respective footprints. These DBS systems typically handle large amounts of information, i.e., audio, video and data, over the C-band (3.7–4.2 GHz) and Ku-band (10.95–14.50 GHz) directly to small receiving dish antennas at the user location. Data broadcast to an individual consumer's home via the DBS system would be relayed to the transceiver and would also be able to be displayed on the user's television set. The LLEO system is not capable of handling large amounts of data, while DBS can manage large data packets with relative ease at relatively low cost. However, DBS systems cannot provide two-way communications with the control center. The LLEO system, on the other hand, is well suited for providing two-way communications and handling small bursty packets of data (typically 6–256 bytes). Accordingly, combining the two networks provides an optimized architecture for delivering large amounts of data to the home, while providing a return path for small packets of data, such as, for example, meter reads, power outage notification, data requests, and the like.

All of the above embodiments may optionally include a system for sending and receiving encrypted messages, thereby providing additional security to protect the system from compromise by unauthorized users. In an exemplary scheme, the messages from the control center may be encrypted using user specific keys which are also resident in a secure memory portion of the transceiver. The control center would have a list of keys of authorized users and would appropriately encrypt messages so that only authorized users, i.e., the users having the appropriate decryption key, would be able to process the encrypted communication. The authorized user would decrypt the information for use on-site and would likewise encrypt the return signals with either its specific user-associated key (for example, some version of the transceiver serial number) or with a special transmission key stored in the secure memory of the transceiver.

Accordingly, in addition to overcoming the deficiencies of the prior art, the above and other numerous attendant advantages are achieved by the present invention, which provides a system for monitoring and controlling devices associated with a user from a control center, said user being located remotely from said control center, the system including: a programmable transceiver adapted to provide monitoring and control interfaces for the devices and for providing two-way communications with the control center via a low earth orbit satellite, the communications being modulated on signals having frequencies below 1 GHz, and the transceiver being programmed to transmit data related to the devices in response to at least one of a signal from the control center or a processing center communicated to the transceiver via the low earth orbit satellite; a program of the transceiver; a predetermined time interval programmed into the transceiver; and an alarm or exception condition signal generated by the user or any of the devices and communicated to the transceiver. The transceiver may include a microprocessor for providing monitoring and control interfaces and programmable control of the transceiver. The transceiver may also be in electronic communication with a gateway, wherein the gateway provides interfaces for a plurality of remote users residing in a predefined area, the gateway selectively communicating data to and from the devices responsive to at least one of: signals received from the control center via the transceiver; a predetermined time interval programmed into the gateway; and an alarm or exception condition signal from any of the users or any of the devices.

BRIEF DESCRIPTION OF THE DRAWINGS

The invention will be described in detail herein with reference to the following drawings in which like reference numerals refer to like elements, and wherein.

DETAILED DESCRIPTION OF PREFERRED EMBODIMENTS

Figure 1:
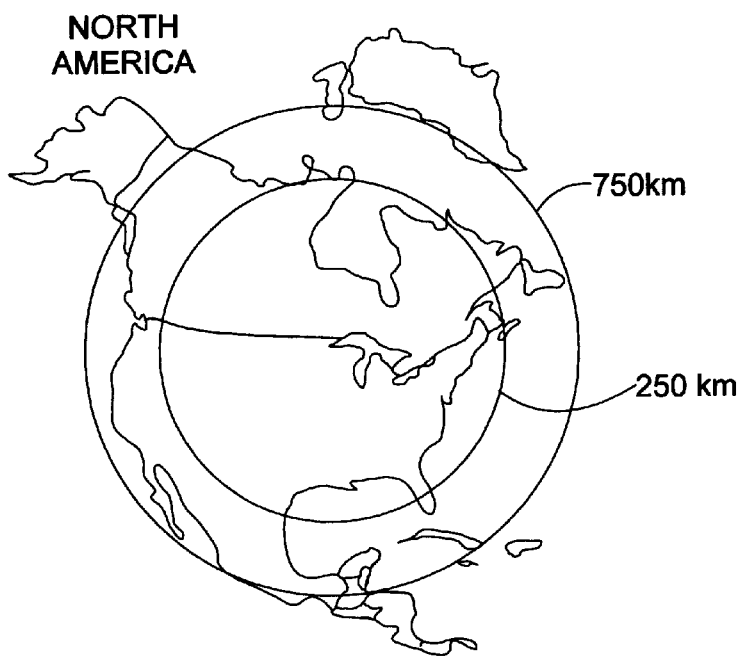
FIG. 1 is a map of North America showing exemplary visibility area footprints for low earth orbit (LEO) satellites at a 250 km altitude and a 750 km altitude.
Figure 2:
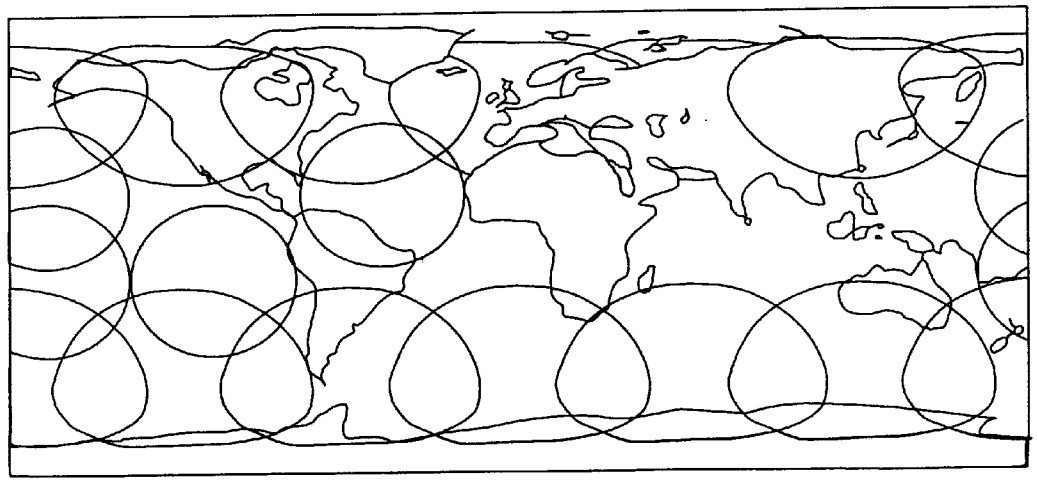
FIG. 2 is a condensed map of the world showing representative coverage of a constellation of twenty-four LEO satellites at a given point in time.
Figure 3:
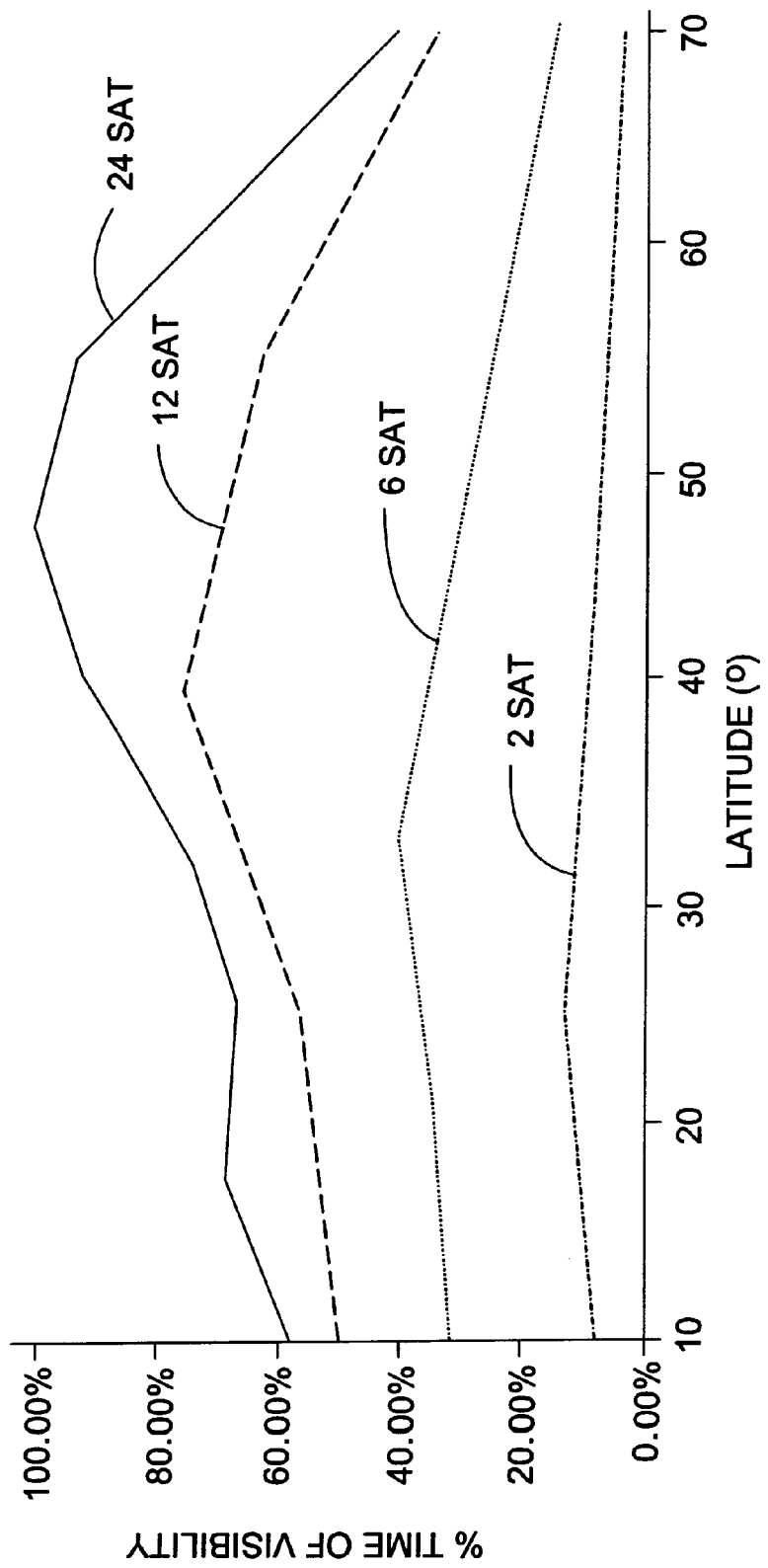
FIG. 3 is a graphical chart showing coverage statistics for a constellation of LEO satellites, wherein the Earth latitude is shown on one axis and the percentage of time of visibility of a two, six, twelve and twenty-four LEO satellite constellation system is shown on the other axis.
Figure 4:
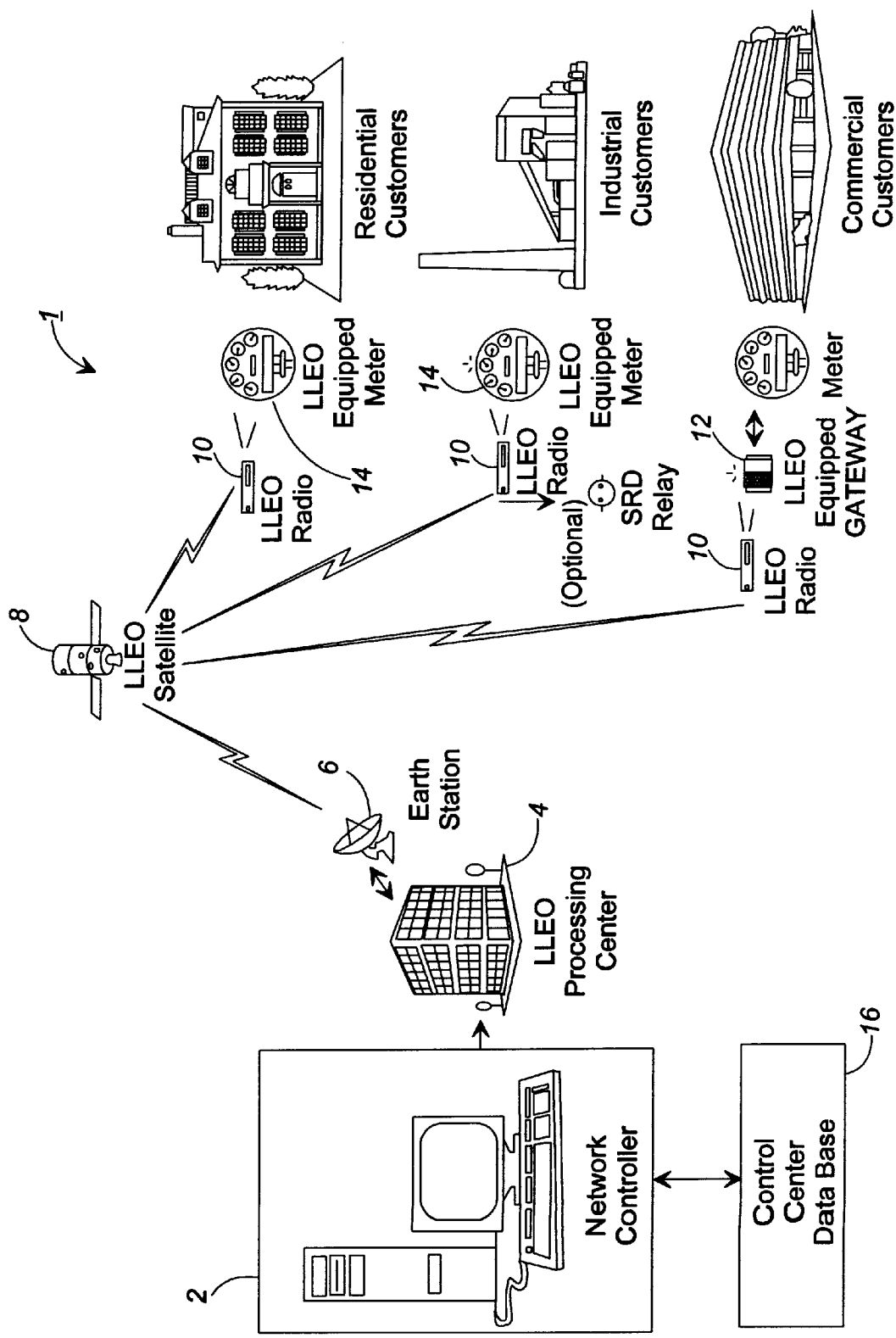
FIG. 4 is a system overview of an embodiment of the present invention, wherein a LLEO satellite is in communication with a control center via an earth station and a processing center on one end, and with remote users via a plurality of transceivers on the other end, the remote users including residential, industrial and commercial users, wherein the transceiver associated with the commercial users communicates to the users via a gateway.

Referring to FIG. 4, a system overview of a preferred embodiment of the present invention is shown. The system 1 is comprised of three major subsystems: service provider infrastructure; satellite service provider infrastructure; and LLEO transceivers located at remote user sites. The service provider infrastructure includes a network controller 2 which acts as a control center for the system. The control center 2 is in communication with a control center database 16, which may be collocated with the control center 2 or may be remotely located and accessed via any known telecommunications interface, such as, for example, landline communications systems (e.g., telephone lines, coaxial cable, etc.) line-of-sight systems (e.g., microwave), cellular, terrestrial narrowband radio, etc. The control center database 16 contains a wide variety of information related to the consumers or users of the services controlled by the control center 2. For simplicity of illustration, the system will be described herein with reference to utility systems and services. However, it will be understood that the system and principles described herein are equally applicable to any of a wide variety of services that may be controlled remotely from a central location, such as, for example, pay-per-view television billing, polling and monitoring services, etc. The control center database 16 includes data specific to individual customers who are part of the system 1. Using information contained in the control center database 16 or based on independent queries and commands generated at the control center 2, the control center 2 communicates various command and control signals to transceivers 10 of the users, and receives signals from the various transceivers 10, via the satellite service provider infrastructure.

The satellite service provider infrastructure comprises a LLEO processing center 4, earth stations 6 and the LLEO satellites 8. The LLEO processing center 4 is responsible for receiving communications from the transceivers 10, processing the communications and passing the communications on to the control center 2. The LLEO processing center 4 is also responsible for transmitting communications from the control center 2 or messages generated at the LLEO processing center 4 itself, to the various transceivers, via the LLEO satellites 8. The LLEO processing center 4 has the capability to perform predetermined monitoring functions in accordance with parameters determined by the service provider. For example, the LLEO processing center 4 may be programmed to monitor or poll utility usage at predetermined times without receiving specific instructions from the control center 2, and reporting the results of its poll to the control center 2. The LLEO processing center 4 may also be instructed to monitor alarm and exception conditions received from the various transceivers 10. The satellite service provider infrastructure is owned and operated by the satellite service provider and is generally not owned by the utility service provider or owner of the control center.

The LLEO processing center 4 is a central communications node between the LLEO satellite 8 and the control center 2. The LLEO processing centers 4 are generally in communication with the earth stations 6 via a 50 kbps landline connection. However, any other means of communication between the LLEO processing center 4 and the earth stations 6 may be used. The main LLEO processing center (not shown) is typically connected to four earth stations 6 strategically located to provide constant coverage of an entire continent or country, for example, the United States. Having complete and continuous coverage of a given region facilitates real-time bent pipe communications for many, if not all, of the satellite passes of the LLEO satellites 8. The earth stations 6 transmit and receive messages to and from the various LLEO satellites 8 as the become visible to the earth station 6.

Figure 5:
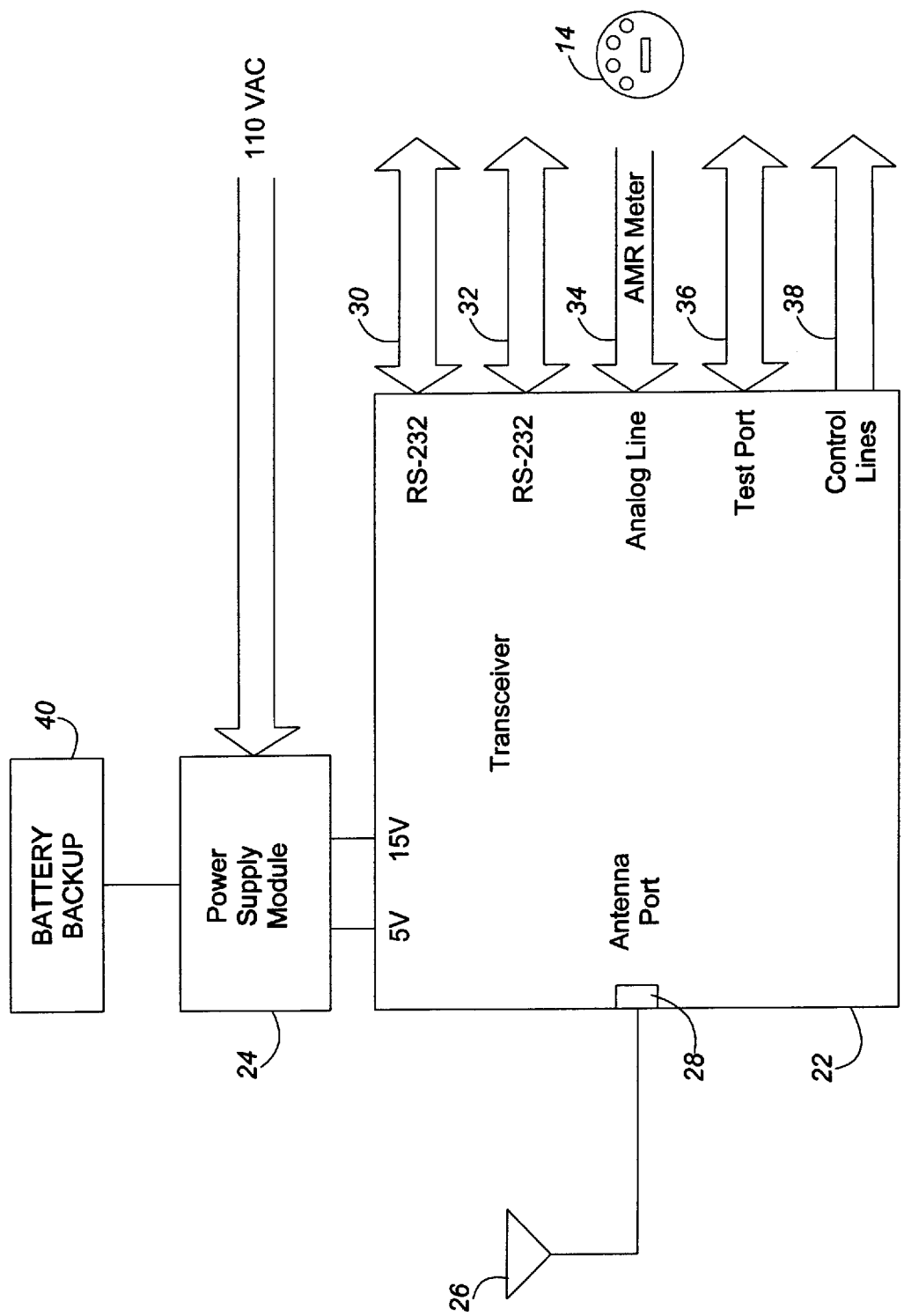
FIG. 5 is a block diagram of a transceiver in accordance with an embodiment of the present invention.
Figure 6A:
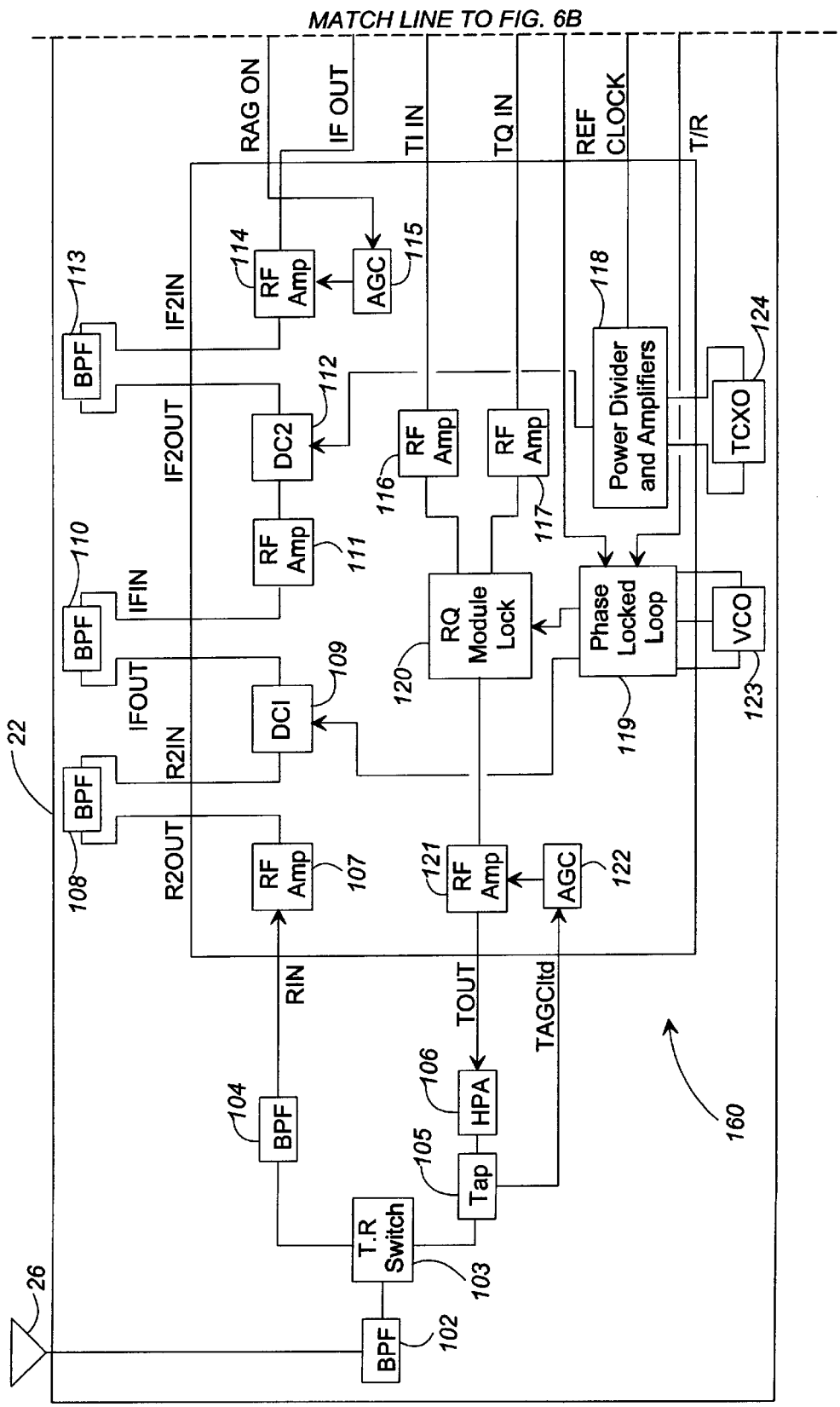
FIG. 6 is a more detailed block diagram of an embodiment of the transceiver apparatus in accordance with the present invention showing details of the processor subsystem and transceiver subsystem of the apparatus.
Figure 6B:
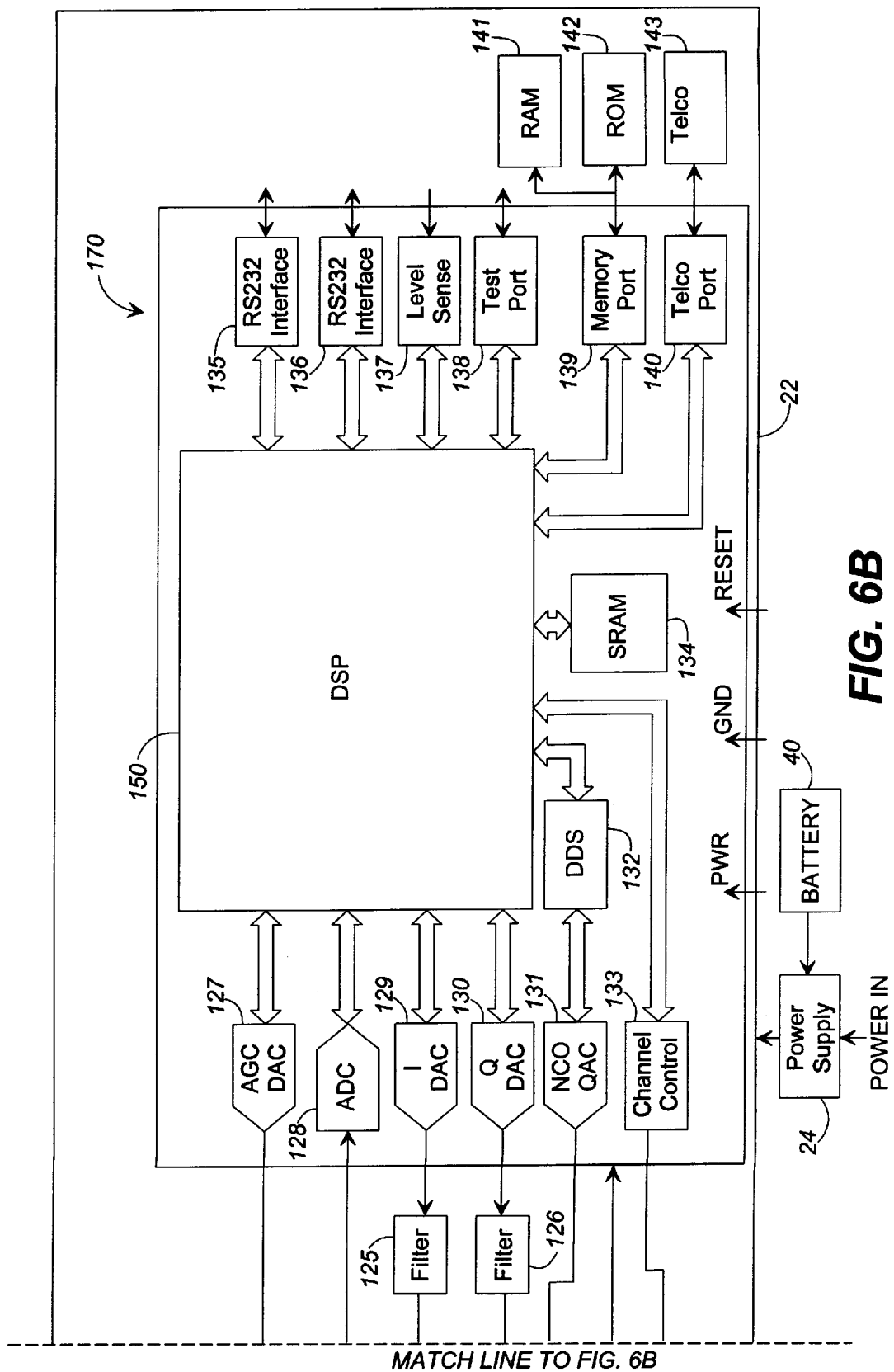

At the user end of the system 1, various users are provided with LLEO radios 10 the include a LLEO transceiver (not shown in FIG. 4, see FIGS. 5 and 6). Various equipment may be connected to the transceiver via numerous interfaces provided therewith. For example, in FIG. 4, automated meters are connected to the LLEO radios 10 of the various users via the LLEO transceivers. The types of equipment, their functions and their connections to the LLEO transceiver and LLEO radio 10 will be discussed in detail below. It will be understood that the remote command and control system of the present invention in not limited to residential use or to energy management systems. Command and control signals for any number of different types of users, such as, for example, industrial and commercial customers, for any number of remotely controllable functions is also contemplated.

Turning now to FIG. 5, a block diagram of an overview of the transceiver apparatus 22 of the present invention is shown. The transceiver 22 is preferably microprocessor controlled and programmable. Additionally, the transceiver is equipped with a memory (not shown) which may be a separate memory or may be incorporated into the microprocessor control unit (not shown, see FIG. 6). The transceiver 22 is connected to an antenna 26 via an antenna interface port 28. The antenna may be any type of antenna suitable for providing UHF and/or VHF communications with an orbiting LLEO satellite. Examples of such antennas include single whip antennas and embedded dipole antennas associated with a DBS satellite receiver dish. The transceiver 22 is powered by a power supply module 24 which provides five and fifteen volt direct current voltage to the transceiver 22. The power supply module 24 is generally connected to the user's a-c power outlet (not shown). In addition, the power supply module 24 is provided with a battery backup 40 which provides backup power in the event that the user experiences a power outage or power is otherwise disconnected from the power supply module 24. The transceiver 22 is further provided with a number of equipment interfaces for communicating with various devices that may be commanded, controlled and monitored by the control center 2. These interfaces may include, for example a plurality of RS-232 ports 30, 32, an analog interface 34 for interfacing with an analog device, such as, for example, an automated meter 14, a test port 36 for providing system testing and signalling and additional control lines 38 for connection to system related devices, such as, for example a load control device (not shown) and an service connect/disconnect relay (not shown).

FIG. 6 is a block diagram of the transceiver 22, including details of the interconnections and circuitry of the transceiver portion of the transceiver apparatus 22 and the microprocessor portion thereof. With reference to the embodiment shown in FIG. 6, the transceiver apparatus 22 is made up of two subsystems: the transceiver subsystem 160; and the processor subsystem 170. It will be understood that the transceiver 22 of the present invention may preferably be realized on an application-specific integrated circuit (ASIC) or may be realized using individual components and wiring in accordance with known techniques. The transceiver subsystem 160 is the main conduit for receiving communications from, and transmitting communications to, the LLEO satellite 8. The antenna 26 is the radiating element used for both transmission and reception of signals between the LLEO satellite 8 and the transceiver apparatus 22. In most cases, the antenna 26 will be omindirectional, i.e., no gain, however, in certain embodiments using the transceiver 22 for energy management system, for example, the antenna 26 may be somewhat directional, meaning that the antenna 26 will have some gain when looking at the sky from 20 degrees to 50 degrees off the horizon. A bandpass filter 102 is coupled with the antenna to filter out some of the large signals that can be present in the area of the transceiver apparatus 22, such as, for example, signals transmitted under the authority of the Federal Aviation Administration (FAA) near airports, television signals, etc. If unattenuated, these signals may swamp the transceiver subsystem 160, thereby rendering it ineffective. A T/R switch 103 is coupled to the bandpass filter 102 and is used to route the received signal from the antenna to the receive path of the transceiver subsystem 160 or to route signals from a transmit path of the transceiver subsystem 160 to the antenna for transmission. The T/R switch 103 is controlled by signals from the processor subsystem 170 and the microprocessor 150 associated therewith. The description of the operation of the transceiver apparatus 22 will continue by following a signal from the antenna through the receive path of the transceiver 22, through processing by the processor subsystem 170 and finally, following the transmission signal through the transmit path of the transceiver 22.

Once the signal has passed through the T/R switch 103 onto the receive path, the signal is directed to a high-pass filter (HPF) 104 which is used to filter out undesired large signals that do not pertain to the system of the present invention. As is well known, an HPF passes higher frequencies while attenuating lower ones. The frequencies allowed to pass and those attenuated are based on the characteristics of the HPF. The signal filtered by HPF 104 is then amplified by RF amplifier 107 which boosts the received signal to a level usable by the transceiver subsystem 160. The amplified signal is then further processed via a bandpass filter (BPF) 108 which further filters undesired signals both above and below the desired band of the system. The further filtered signal is then communicated to a mixer (DC1) 109 which combines the receive frequency with a local oscillator frequency to produce a signal at a desired processing frequency. The signal from the mixer 109 is further processed by bandpass filter 110, which is tuned to the new desired processing frequency and filters out signals above and below the processing frequency. The signal from the bandpass filter 110 is then amplified at the processing frequency by RF amplifier 111. The amplified signal at the processing signal is then mixed with a second local oscillator frequency by a second mixer (DC2) 112 to produce a signal having an IF frequency that is more easily processed by the processor subsystem 170. The IF signal from the second mixer 112 is filtered by another bandpass filter 113 which is centered about the IF frequency. This filtered signal is amplified by a variable gain amplifier 114 prior to transmission to the processor subsystem 170. The gain of the variable gain amplifier 114 is controlled by an automatic gain control (AGC) circuit 115. The AGC 115 receives a control signal from an automatic gain control digital-to-analog converter that takes a digital command from the microprocessor 150 of the processor subsystem 170 and generates a corresponding analog voltage that variably adjusts the amount of gain in amplifier 114. It should be noted that the digital-to-analog converter 127 is able to incrementally control the resulting analog signal in small steps. Variable adjustment of the signal by amplifier 114 is performed to keep the signal level at approximately the same level as the input of the analog-to-digital converter 128 of the processor subsystem 170.

Turning now to the processor subsystem 170 of the transceiver apparatus 22, the signal from the amplifier 114 of the transceiver subsystem 160 is transmitted to an analog-to-digital converter 128. The analog-to-digital converter 128 samples the analog voltage received from the amplifier 114 and converts the signal into a digital word that is understood by the microprocessor 150, which may be, for example, a digital signal processor (DSP) 150 of the processor subsystem 170. The DSP 150 of the processor subsystem 170 is a microprocessor that provides processing capability for signals received from the transceiver subsystem 160 and from devices interfaced to the system of the present invention, for example, automatic meter readers and the like. Accordingly, depending upon the contents of the signal received from the analog-to-digital converter 128, the DSP 150 performs the requisite function.

The modulation scheme used by Orbcomm is called Symmetric Differential Phase Shift Key (SDPSK), while Starsys uses Biphase Phase Shift Key/Phase Modulation (BPSK/PM). Other FCC applications for LLEO licenses have proposed a wide variety of modulation schemes. Both the Orbcomm and Starsys modulations are similar in operation to Quadrature Phase Shift Key (QPSK), but are not capable of transmitting as much data for a given data rate. It will be understood that any modulation scheme may be used in the present invention, however, for simplicity of illustration, operation of the transceiver apparatus 22 of the present invention will be described using an exemplary QPSK model.

QPSK, SDPSK and BPSK/PM are digital communication modulation schemes where two data streams, I and Q, are combined in phase quadrature. One of the primary purposes of this type of modulation scheme is to provide a means for transmitting as many bits of data as possible within a given bandwidth limitation. These modulations provide two bits of data per symbol, where the data is modulated by a 180-degree phase shift. In the case of SDPSK, +/−90-degree phase shifts are used. With the relatively low data rates contemplated for LLEO systems, digital signal processing of the incoming digitally modulated data can easily be accomplished using a software implementation once the data is converted from analog to a digital form.

The DSP 150 communicates messages and commands to the transceiver subsystem 170 using two channels for enhanced capability. These channels are referred to as the I-channel and the Q-channel. The DSP communicates I-channel signals to the transceiver subsystem 160 via digital-to-analog converter 129 and Q-channel signals via digital-to-analog converter 130. The I-channel and Q-channel signals from the respective converters are communicated to respective filters 125, 126 of the transceiver subsystem 160. The filter 125 receives the I-channel signals, while the filter 126 receives the Q-channel signals. Both filters 125, 126 filter out spurious signals that might interfere with the operation of the system of the present invention. The filtered signals are then amplified by RF amplifiers 116, 117, respectively. The RF amplifiers act in the same manner as amplifier 111 of the received signal path, i.e., amplifying the signal level at a desired frequency. The I- and Q-channel signals are transmitted from the amplifiers 116, 117 to an I/Q modulator 120 which takes the two channels of data and modulates them into one signal to be transmitted and outputs the signal to another amplifier 121. Combining the two channels of data into one signal provides a more efficient system. The frequency of the signal output from the I/Q modulator 120 is provided by a phase-locked loop 119, which takes a reference frequency from a local oscillator, such as, for example, a voltage controlled oscillator 123, and generates variable output frequencies based on control words sent out by the DSP 150 via a channel control output 133 thereof. The channel control 133 is a digital word that corresponds to the frequency, i.e., channel, that the phase-locked loop 119 will be commanded to. The phase-locked loop 119 also receives signals from a direct digital synthesizer 132 which uses a clock and look-up tables in the DSP 150 to create synchronous word commands that correspond to an analog voltage that replicates, in time, a sinusoidal frequency. The digital signal of the direct digital synthesizer 132 is converted into an analog signal by digital-to-analog converter 131. The phase-locked loop 119 also accomplishes some filtering of signals to improve performance of the transceiver 22. The signal output by the I/Q modulator 120 is amplified by variable gain amplifier 121 which varies the gain applied to the signal in accordance with a signal received from automatic gain control 122. The automatic gain control signal of the automatic gain control 122 is based on a signal received from a tap 105 which monitors and measures the amplitude of the transmitted signal. The signal from the amplifier 121 is transmitted to a high-powered amplifier 106 which amplifies the signal to its final level before being connected to the antenna 26 for transmission. As previously discussed, the T/R switch 103 is positioned to transmit the signal from the high-powered amplifier 106. The transceiver subsystem 160 further includes a second local oscillator 124 which may be, for example, a temperature controlled oscillator. The second oscillator provides a signal to a power divider/amplifier 118 which splits the signal and boosts the gain before distributing the signal to the DSP 150 as a clock signal and to the second mixer 112.

Referring once again to the DSP 150 side of the transceiver apparatus 22, the processor subsystem 170 also includes a static random access memory 134 that is used to store programs that instruct the DSP 150. It will be understood by one of ordinary skill in the art that any number of different memories may be used in place of the static random access memory 134, especially where the DSP 150 is to be reprogrammed via signals received from the control center 2. The DSP 150 also includes RS-232 interface ports 135, 136, which receive serial data from devices connected thereto, i.e., devices that are controlled and/or monitored by the system of the present invention. It is also advantageous for the DSP 150 to be provided with a level sense 137 that acts as a threshold detector for detecting signals transitioning from a zero to a one. A test port 138 is also provided. The test port 138 is an interface that allows the circuit to be tested for proper functionality before shipping to the customer. It may also be used to test the remote location circuit if so programmed and instructed via the DSP 150. The system may also be provided with off-circuit memories, such as, for example, a random access memory 141, or the like, and a read-only memory 142. In an exemplary embodiment, the random access memory 141 may store software programs to be executed by the DSP 150, while the read-only memory 142 may store complete programming and downloads code to the random access memory 141 for execution by the DSP 150. The processor subsystem 170 may also optionally include a telco port 140 which could communicate with telephone circuits 143 for providing local telephone company connectivity. As discussed above with reference to FIG. 5, the power supply 24 receives power from the user's a.c. circuits and may optionally be provided with a battery backup 40.

Operation of the present invention will be illustrated herein using the system in an illustrative energy management environment. It will be understood that using the system for energy management is illustrative in nature and that alternative uses will be apparent to those skilled in the art. As discussed above, a remote command, control and monitoring system in accordance with the present invention comprises three major components: the LLEO transceiver apparatus 22; the LLEO satellite service provider infrastructure, including the LLEO processing center 4, the earth station 6 and the LLEO satellites 8; and the command and control infrastructure, which includes the control center 2 and the control center database 16.

The LLEO service provider infrastructure includes the LLEO processing center 4, the earth stations 6 and the LLEO satellites 8. Once implemented, a constellation of LLEO satellites will constantly be circling the earth. The constellations of satellites (currently contemplated to be 24 satellites for Starsys and 36 for Orbcomm) will be put into inclined polar orbits. Groups of satellites will then be separated into different planes and equally spaced to provide constant coverage. Once these systems are fully deployed, there will be constant, real-time coverage all over the world. Moreover, in the Orbcomm constellation, three satellites will always be in view of any given location. The real-time coverage of the globe will permit the LLEO satellite system to be used for features that require bent pipe communications capability.

Each LLEO network can operate in two primary modes: bent pipe (real-time); and store and forward. In most locations of the United States, the system will be able to operate in the bent pipe mode, where the data received by the transceiver of the LLEO satellite is immediately relayed to an earth station 6. Operation in bent pipe mode requires that the satellite antenna footprint be capable of seeing both the user transceiver apparatus 22 and the earth station 6 at the same time. The antenna footprint of any given satellite in the LLEO satellite network is several thousand miles in diameter. Accordingly, most regions of a given country will be able to operate in the bent pipe mode. The bent pipe mode of operation will be capable of making user information available to a given control center 2 in less than one minute. The store and forward mode is used when the ground station and the transceiver apparatus 22 or the control center 2 cannot be seen at the same time from a given satellite. In this case, the satellite simply stores the data in on-board memory until it comes into contact with the next available ground station. Use of store and forward mode is not considered to be of primary importance in the United States due to the coverage that will be available. However, until the entire LLEO satellite network is in place, store and forward may be a primary mode of operation.

Both the Orbcomm and Starsys systems can handle significant amounts of data and should be sufficient for the requirements of the present invention. For example, each Orbcomm satellite contains seven antennas and receivers and seventeen computers which can transmit up to 50,000 messages per hour. A full constellation of 36 satellites would accommodate 1.8 million transmissions per hour or 43.2 million transmissions per day.

The LLEO processing center 4 is connected to a regional earth station 6 through a 50 kbps land line (not shown). The LLEO processing center 4 is responsible for receiving requests from the control center 2 for information and processing. Additionally, the LLEO processing centers may use predetermined profiles set up by the service provider to access desired information from users. For example, the control center 2 may set up the system to read designated meters once a month on a predetermined day. The system could accommodate this task without requiring additional commands from the control center 2. The processing center also stores all messages until the have been successfully transmitted to the control center 2 or remote transceiver apparatus 22 and a receipt is received.

The earth stations 6 comprise an RF interface to the satellites 8, and track each satellite as it sweeps from horizon to horizon. The earth stations 6 also relay data to and from the satellite 8. Each earth station comprises two tracking antenna systems (not shown), with each antenna tracking successive satellites.

Having a constellation of LLEO satellite provides numerous propagation related advantages. Most transceivers will see a large number of direct line-of-sight passes by the LLEO satellites each day. This will occur regardless of where the transceiver apparatus 22 is mounted on any particular building because each successive satellite passes over in a different location, i.e., satellites are placed into a number of different planes, which guarantees that every side of a given building location will have ample coverage. Additionally, the differing locations of successive satellite passes reduces the possibility of blockage, multipath and other fading problems commonly associated with terrestrial systems.

With reference to FIGS. 5 and 6, the LLEO transceiver apparatus 22 is designed to handle two-way communications for small bursty packets of data, i.e., typically 6–256 bytes. The LLEO transceiver apparatus 22 is preferably microprocessor controlled and has a memory, such as, for example, a random access memory, for storing data for retrieval and transmission at a later time. A microprocessor based transceiver apparatus 22 is preferred for its flexibility and ease of reprogramming, and for its ability, in the present invention, to be programmed remotely by the control center 2 via the LLEO satellite 8 network. Additionally, the LLEO transceiver apparatus 22 of the present invention is implemented on a circuit board or printed wiring board (PWB), or the like. However, it will be apparent to those skilled in the art that any number of alternative designs may be used to implement the LLEO transceiver apparatus 22 of the present invention, including a hardwired and hardwire programmed implementation, implementation on an application specific integrated circuit (ASIC), or the like. Additionally, programming of the LLEO transceiver apparatus 22 may be accomplished via signals from the control center 2 to the microprocessor static random access memory, via an on board programmable read-only memory (PROM), programmable logic arrays (PLAs), and the like. The LLEO transceiver apparatus 22 may be programmed to report specified data in response to at least one of the following: a signal from the control center 2 or LLEO processing center 4 communicated to the transceiver apparatus 22 via a LLEO satellite 8; a predetermined time interval programmed into the transceiver apparatus 22; a program resident in the LLEO transceiver apparatus 22; and an alarm or exception condition signal generated by any of the devices connected to the transceiver apparatus 22 or generated by the user. In addition to having the capability to be individually addressed, the transceiver apparatus 22 of the present invention is also able to receive a group broadcast from the control center. A broadcast message initiates a response in all transceivers or to a selected group of transceivers. It will be apparent to those skilled in the art how to address such broadcast type messages so that the intended transceivers receive the broadcast message. Broadcast message capability is a cost-effective way for real-time pricing or load control in an energy management environment.

Figure 13:
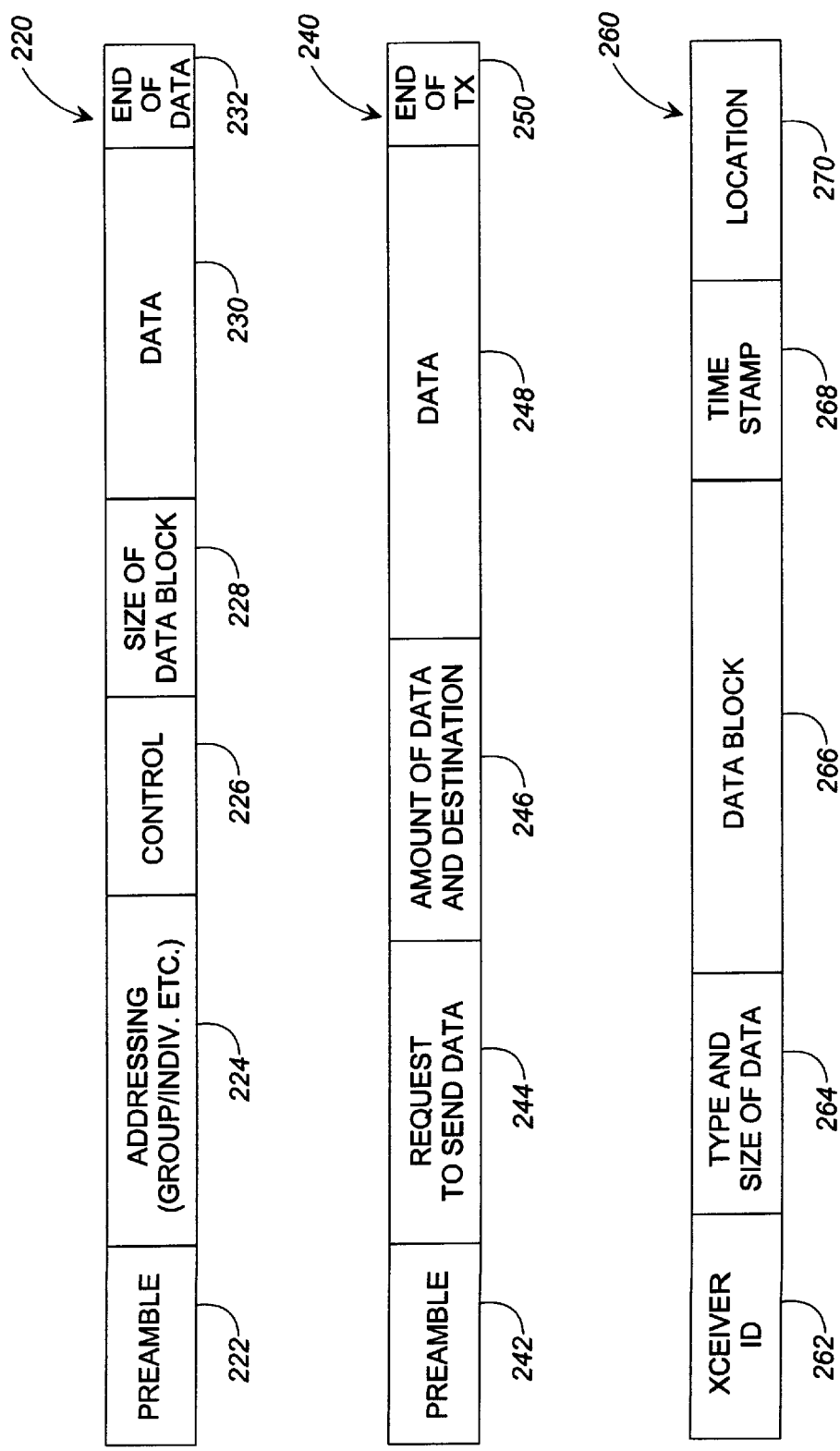
FIG. 13 is a diagrammatic representation of a typical data packet for use with the present invention.

Exemplary data configurations for the signals transmitted by the LLEO satellite 8 to the transceiver apparatus 22; from the transceiver apparatus 22 to the LLEO satellite 8; and a typical data format are shown in FIG. 13. It will be understood that these formats and signals are purely illustrative and that any suitable data structure and messaging scheme is usable in the present invention. Turning now to FIG. 13, a signal 220 transmitted by the LLEO satellite 8 to the transceiver apparatus 22 is shown. The signal 220 includes a preamble 222 that is typically used to synchronize the transmitter and receiver (not shown). The preamble 222 is followed by an addressing block 224 which specifies the type of addressing the message is going to have, such as, for example, group broadcast or individual addressing. The frequency and time slot allocation data is generally contained in a control segment 226 which typically follows the addressing block 224. The size of the data block to be sent and other general housekeeping data may be contained in the block 228, which is followed by the actual data block 230 which contains the data for the transmission. The signal typically ends with an end of data signal block 232 indicating the termination of that particular signal.

The signal sent from the transceiver apparatus 22 to the LLEO satellite 8 is illustratively represented by the block labelled 240. The block 240 typically begins with a preamble 242 which is similar in function to the preamble 222 of the block 220. The request to send data is containe in block 244 and is followed by a block 246 indicating the amount of data to be sent and the destination of the signal. The data is contained in block 248 and is followed by an end of transmission inidcator 250.

An exemplary data format 260 is also shown in FIG. 13. The data generally includes an identification block 262 which identifies the transceiver to which the signal is directed. The size and type of data are indicated in block 264, such as, for example, a meter read, power outage notification, request for data, real time pricing, load control verification and notification, etc. The data block 266 contains the actual data and is followed by a time stamp 268 which is used for audit and security purposes. In the case where the transceiver apparatus 22 is coupled to a mobile device, such as, for example, a remote e-mail terminal or laptop computer, a location indicator block 270 may also be optionally included in the data signal.

Another important feature of the present invention is the ability of the control center 2 to reprogram the transceiver apparatus 22 remotely via the LLEO satellite network. The control center, using broadcast capability, for example, will be able to update existing software programming of the transceivers or to reprogram individual transceivers with programming features specific to that particular transceiver and its location.

In the simplest configuration, the transceiver apparatus 22 can be directly connected to a meter 14 that has been modified to enable communication with the transceiver apparatus 22, for example, the meter 14 may be retrofitted with a pulse initiator circuit (not shown). In more complex arrangements, the transceiver apparatus 22 may be connected to any of a number of devices at the remote user location. For example, the transceiver apparatus 22 may be connected to a security system for monitoring alarm conditions, a display for displaying pricing or other information requested by the user, facility monitoring equipment that, in addition to monitoring consumption, could monitor the status of various devices, a load control device, could monitor whether the battery backup is being used and/or a service connect/disconnect/reconnect relay. These devices are merely illustrative, and it will be apparent to those skilled in the art that many other devices and systems may be connected to the transceiver apparatus 22 of the present invention.

The transceiver apparatus 22 may also be provided with a memory (not shown) that may store predetermined data from various devices for archival transmission to the control center 2 upon receipt of a command from the command center 2 or at a predetermined time interval programmed into the transceiver apparatus 22. The memory may also be used to store rate change information in conjunction with power consumption at the time of the rate changes to enable the control center to correlate consumption during a particular time period and a variable rate that may have been applied.

The transceiver apparatus 22 may also monitor the system to which it is interfaced to detect alarm signals or exception condition signals generated by the user to initiate communications with the control center 2. For example, an alarm signal for a user security system that is interfaced to the transceiver apparatus 22 may initiate communication with the control center 2 which, in turn, may initiate an appropriate response to the signal. Exception conditions may be initiated by the user to request data or service from the control center 2. For example, the user may request current usage and rate information for display on a display device of the user that is interfaced to the transceiver apparatus 22, or to a gateway 12.

Figure 12:
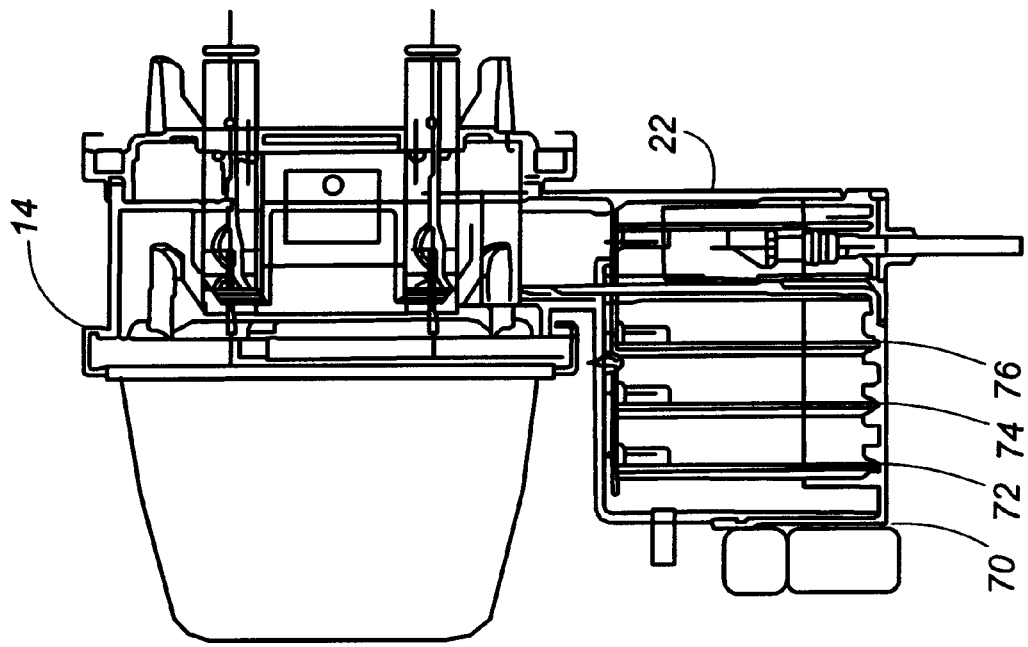
FIG. 12 is a cross-section of the schematic diagram shown in FIG. 11.
Figure 11:
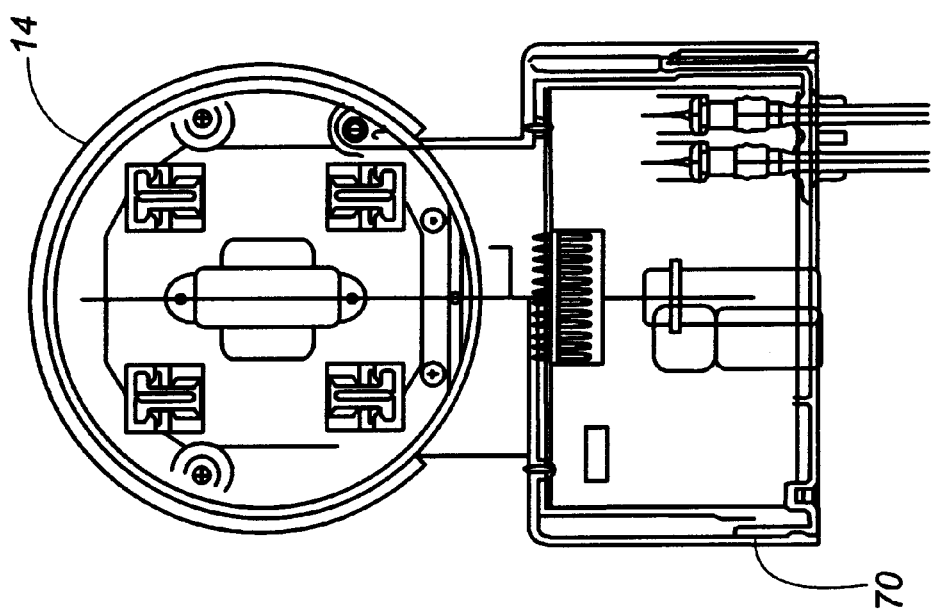
FIG. 11 is a schematic diagram showing a collar or housing, in which the transceiver apparatus of the present invention is disposed, the collar being attached to a base of a power usage meter.

The transceiver hardware and interfaces may optionally be located physically inside a collar or other such protective device that is placed, for example, between the meter 14 and its base. Referring now to FIG. 11, the transceiver apparatus 22 is disposed in a collar or housing 70. In addition to housing the transceiver apparatus 22, the antenna 26 is also embedded in the collar 70. Turning now to FIG. 12, the collar may also be adapted to enable connectivity to a wide variety of interface cards 72, 74, 76, which may interface to various devices or to a gateway (not shown). In addition to providing expanded connectivity of the LLEO transceiver apparatus 22, the collar 70 provides protection against the environment and vandalism.

In another embodiment, the transceiver apparatus 22 is in communication with a gateway 12. The gateway 12 can provide greatly enhanced features and broader functionality. In this embodiment, the transceiver apparatus 22 provides the two-way communications with the control center 2, while the gateway 12 performs all of the standard interfaces with the remote user devices. For example, a gateway 12 may be used in a location where there are numerous users sharing a common area, for example, an office building having many tenants. In this example, the individual tenants and devices are connected to the gateway 12 instead of directly to the transceiver apparatus 22. The gateway 12 may be programmed to address all of the devices of a particular user, one type of device for all users, or specific devices of all or one user. Additionally, the gateway 12 provides enhanced command and control of larger systems, for example environmental controls for large areas, and the like. The transceiver apparatus 22 may be implemented on a printed circuit card that is adaptable to be plugged into the gateway or otherwise integrated therewith, thereby forming an integral unit that does not require any external interfaces to provide communications between the transceiver 22 and the gateway 12.

The gateway 12 may also be used in an individual residential environment by providing the capability to interface with a wide variety of systems, such as, for example, Echelon, CEBus, RF, hardwire, or the like, that can be used to control or monitor a wide variety of energy consuming systems. An example of the types of interfaces and systems that are easily accessible via a gateway configuration is shown in FIG. 7.

Figure 7:
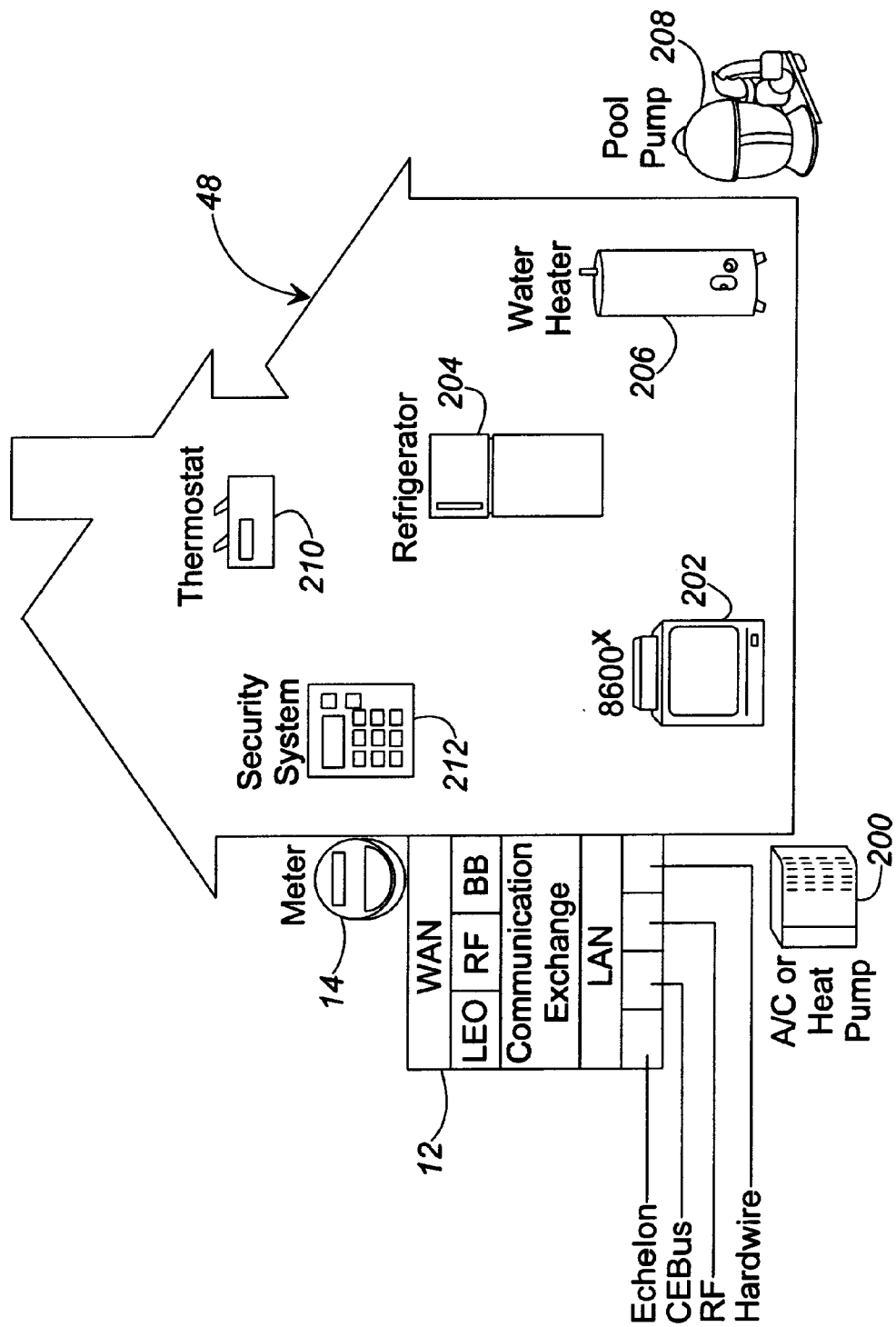
FIG. 7 is a block diagram of a residential user side of the system of the present invention having a local area network connecting various devices to a gateway through the transceiver of the present invention.

Turning briefly now to FIG. 7, a user 48 is connected to the transceiver apparatus 22 of the present invention via gateway 12. While a residential user 48 is shown, it will be understood that the gateway configuration of the present invention is equally applicable to commercial or industrial users. The gateway 12 provides a means for communicating data and control signals from the control center 2 to various appliances or devices at the remote user location. In FIG. 7, a residential user 48 is equipped with a variety of appliances and devices, including, for example, a heat pump 200, a television system 202, a refrigerator 204, a water heater 206, a pool pump 208, a thermostat 210, a security system 212, and an automated meter 14. The gateway 12 includes a backplane (not shown) that is used to interface and translate data on a wide area network (WAN) to a local area network (LAN). The WAN is the network that includes the control center 2 and communicates with a number of end users through potentially various types of infrastructures. FIG. 7 shows three exemplary types of WANs, LEO, which is described herein, RF which may include cellular telephone and BB which includes a broadband communications system, such as, for example, broadband cable. The LAN is the network that provides the communications interface for the appropriately equipped appliances and devices. In this example, each appliance or device would have to be equipped with an Echelon or CEBus interface card. The gateway 12 provides a number of slots for accomodating a wide variety of interface cards. Accordingly, various LAN configurations and types may be used at a single location.

The LAN will typically be a network that uses power line carrier or RF to communicate to the appliances. These two methods are exemplary and are intended to be illustrative only. The power line carrier and RF methods may be implemented using known industry standard buses such as CEBus and Echelon. It will be understood that CEBus and Echelon define methods of communication, data format, etc. and are highly standardized. Using these standards, the gateway 12 can control and monitor status of any desired appliances that are appropriately equipped with the proper interface card.

The system 1 of the present invention may also be equipped to handle secure data communications between the control center 2 and the transceiver apparatus 22 to prevent compromise of the system by unauthorized users and for privacy. When operating in a secure mode, the control center 2 may encrypt the messages being sent to the transceiver apparatus 22, and the transceiver apparatus 22 will be equipped to decrypt the messages in accordance with well known encryption schemes. In an exemplary scheme, the messages from the control center may 2 be encrypted using user specific keys which are also resident in a secure memory portion (not shown) of the transceiver apparatus 22. The control center would have a list of keys of authorized users and would appropriately encrypt messages so that only authorized users, i.e., the users having the appropriate decryption key, would be able to process the encrypted communication. The authorized user would decrypt the information for use on-site and would likewise encrypt the return signals with either its specific user-associated key (for example, some version of the authorized transceiver serial number) or with a special transmission key stored in the secure memory of the transceiver apparatus 22.

Figure 8:
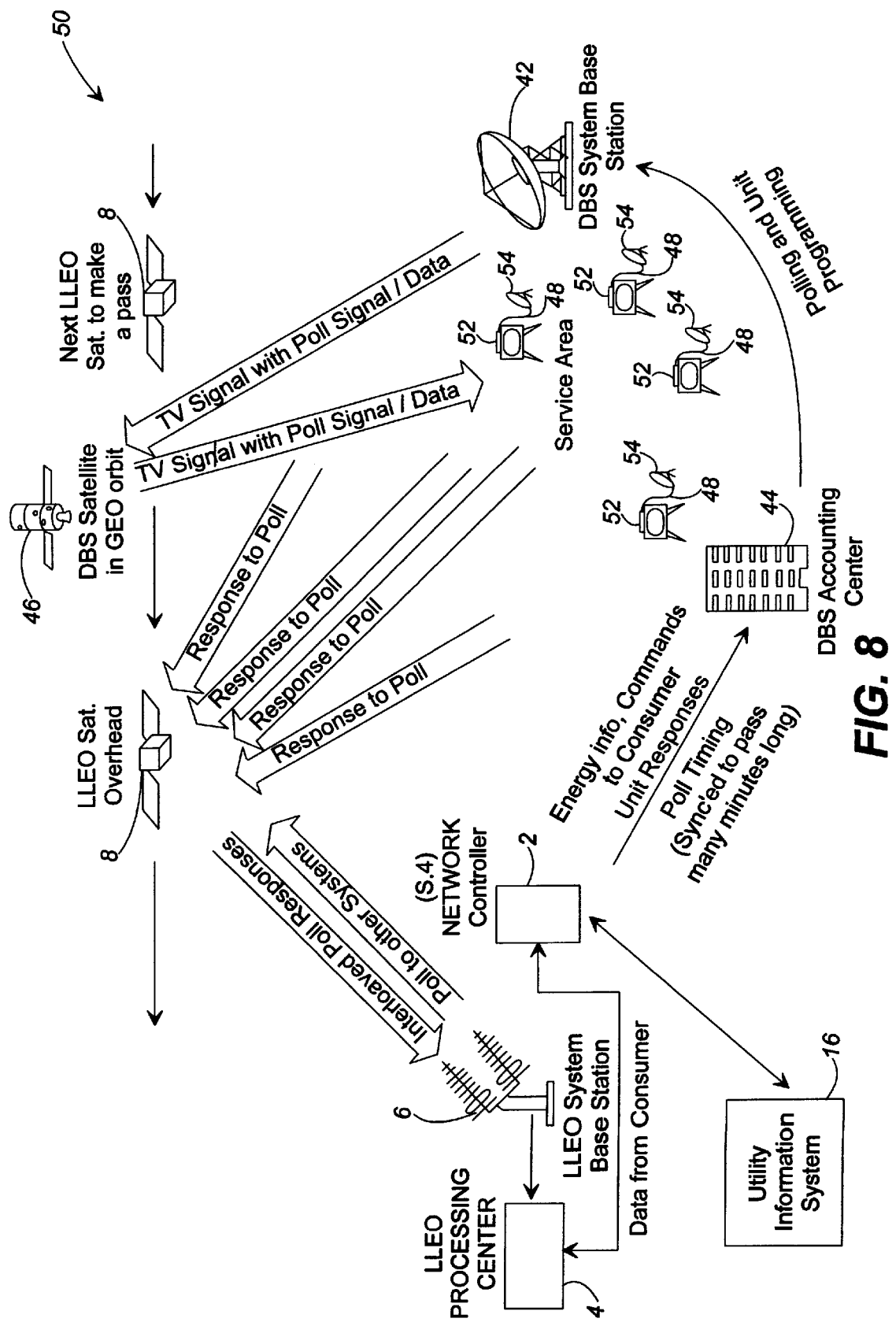
FIG. 8 is a system overview of an alternative embodiment of the present invention, wherein large amounts of data are transmitted to the user from the control center via a direct-broadcast-satellite (DBS) which transmits data at frequencies over 1 GHz, and a return path communicating data from the user to the control center is accomplished via a LLEO satellite.
Figure 9:
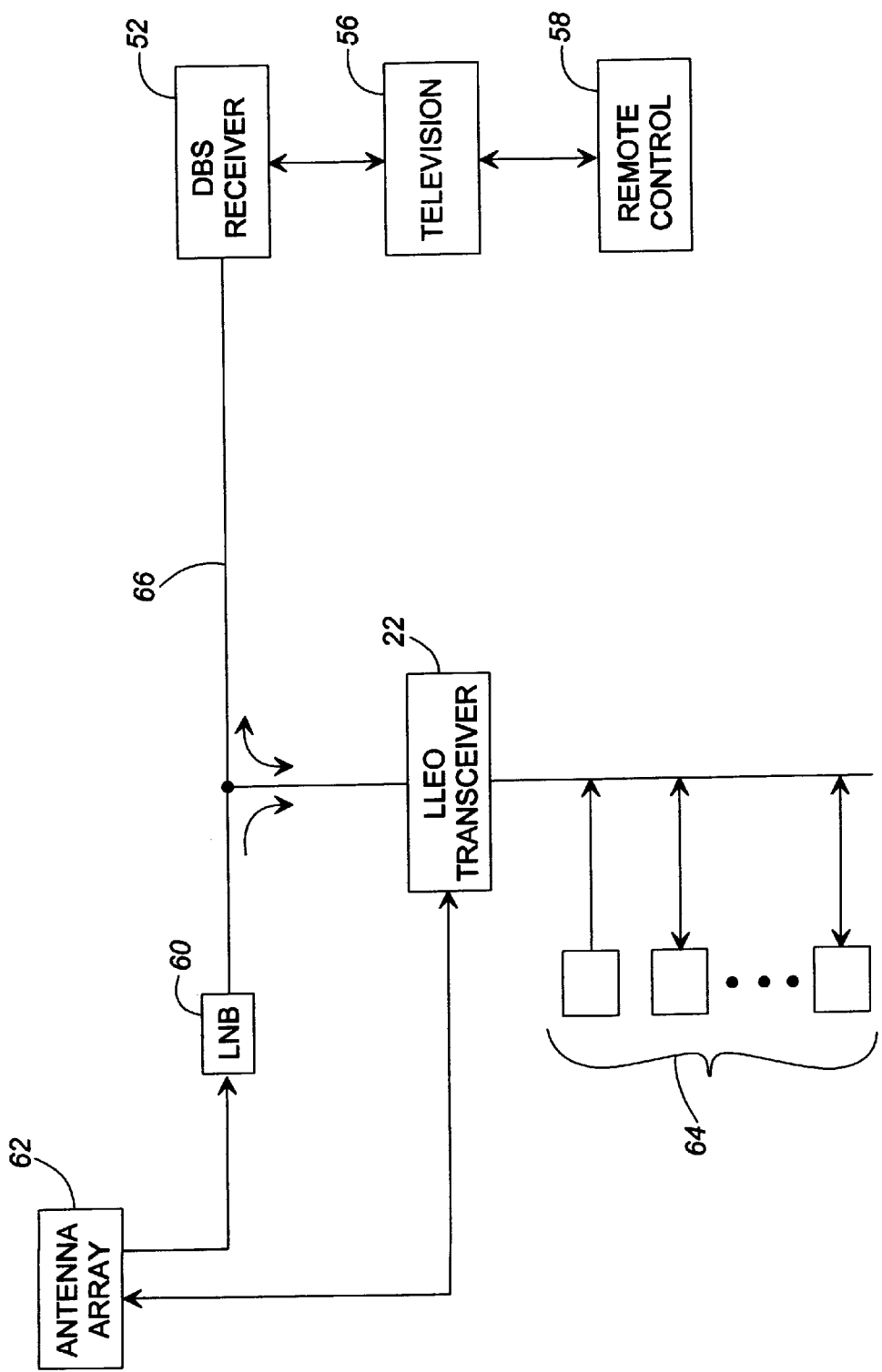
FIG. 9 is a block diagram of the combined LLEO/DBS system of FIG. 8 at the user end.
Figure 10:
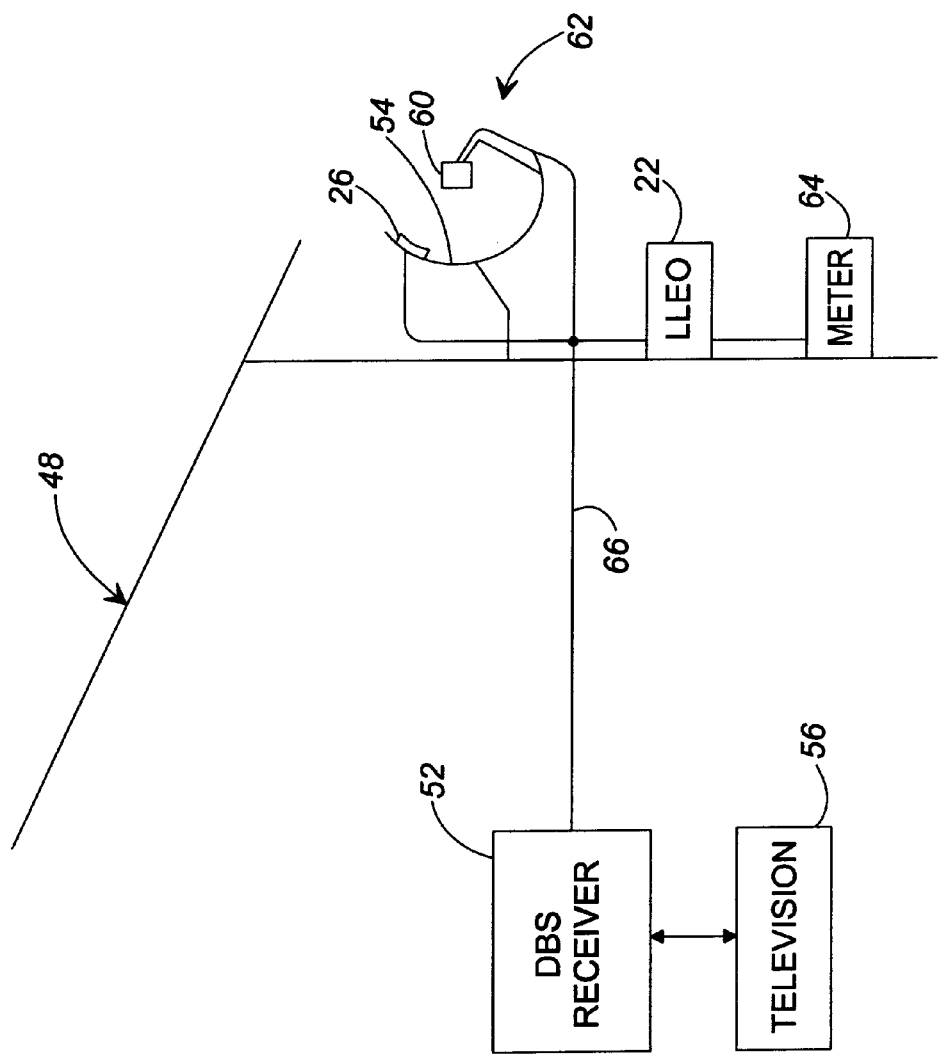
FIG. 10 is a schematic diagram of the user side of the system in accordance with the embodiment shown in FIG. 8 showing the antenna array and system arrangement.

Another embodiment of the present invention is shown in FIGS. 8–10. In this alternative embodiment, users are connected to a direct-to-home (DTH) information subscription service, such as, for example, direct-broadcast-satellite (DBS) television service, which are capable of transmitting large amounts of data from the control center 2 related to controlling and commanding the utility system via the DBS system, while the LEO transceiver apparatus 22 acts to disseminate the information to the various devices interfaced thereto and to provide a return path to the control center 2. Referring now to FIG. 8, a system overview of a system 50 in accordance with a combined DBS and LLEO satellite embodiment is shown. The system 50 is similar to that of the system 1 shown in FIG. 4. However, messages sent from the control center 2 to the LLEO transceiver apparatus 22 at a remote user 48 are processed by the DBS accounting center 44 rather than the LLEO processing center 4. The DBS accounting center 44 provides all of the functionality of a LLEO processing center 4, but handles large data packets that typically cannot be communicated via LLEO satellites 8. In this configuration, the control center 2 and utility database 16 communicate messages to the LLEO transceiver apparatus 22 of an individual user 48 via a DBS infrastructure. The DBS infrastructure includes a DBS accounting center 44 that processes messages for transmission to the LLEO transceiver apparatus 22 via the DBS system. Messages from the DBS accounting center 44 are communicated to a DBS satellite 46 via a DBS earth station 42. The DBS satellite 46 relays the information to a DBS receiver 52 of a remote user 48 via the DBS antenna 54. The receiver 52 is equipped to filter the received data into packets that are intended for the television system and those that are intended for the energy management system.

Turning now to FIG. 9, a block diagram of the combined LLEO/DBS system of FIG. 8 at the user end is shown. Signals transmitted by the DBS satellite 46 are relayed to the antenna array 62 at the user site 48. The antenna array 62 may be either a DBS receiver dish 54 with a LLEO antenna 26 collocated therewith, or a DBS receiver dish 54 having a LLEO dipole antenna 26 embedded therein as described in co-pending, concurrently filed, application Ser. No. 08/ (Attorney Docket No. 1263.49831) to J. B. Wilson, Ray Lewis and Jason Funderburk, entitled "Antenna Apparatus and Method in Satellite Reverse-Path Communications in or Applied to Direct-to-Home Subscription Information Systems," the disclosure of which is incorporated herein by reference in its entirety. In either antenna system 62, signals from the DBS satellite 46 are received by the dish antenna 54 and processed via the low-noise block downconverter (LNB) 60 attached to the dish 54 at the focal point thereof. The LNB 60 downconverts the broadcast signal from the DBS satellite 46 to an IF frequency. Signals intended for the LLEO transceiver apparatus 22 are communicated thereto via coaxial cable 66. The signals intended for the DBS television system are communicated to the DBS receiver 52, which, in turn, processes the signals for use by the television 56. Exception condition signals may be initiated via the remote control device 58 of the DBS system. Such signals may include commands directed to displaying rate and usage information and the like and display these on the television 56. It is contemplated that the data broadcast to the remote user via a DBS satellite 46 can be displayed on the television 56 in a menu and virtual channel configuration. It is also contemplated that the DBS system is capable of tranmitting Internet files down to a user for processing by, for example, a set-top unit or personal computer, or the like. A request for files and other short commands would be executed by the LLEO return path provided by the transceiver apparatus 22. The DBS receiver 52 processes the exception signals from the remote control 58 and communicates the messages to the LLEO transceiver apparatus 22 for transmission to the control center 2 via the antenna 26 of the antenna array 62. The LLEO transceiver apparatus 22 is also connected to a plurality of other devices 64 as described above.

FIG. 10 shows how the antenna array 62 and the LLEO transceiver apparatus 22 may be mounted to a user location 48. The antenna array 62 shown in FIG. 10 includes a DBS dish antenna 54 having a LLEO dipole antenna 26 embedded therein. Signals from the DBS satellite 46 are received by the LNB 60 an communicated to the DBS receiver 52 via coaxial cable 66. The LLEO transceiver apparatus 22 is in communication with the LNB 60 and the DBS receiver 52 via the coaxial cable 66. The LLEO transceiver apparatus 22 is also directly connected to an external device 64, such as, for example, and automated meter, and the LLEO antenna 26.

Current DBS systems use geostationary satellites that cover entire continents in their respective footprints. These DBS systems typically handle large amounts of information, i.e., audio, video and data, over the C-band (3.7–4.2 GHz) and Ku-band (10.95–14.50 GHz) directly to small receiving dish antennas at the user location. Data broadcast to an individual consumer's home via the DBS system would be relayed to the transceiver and would also be able to be displayed on the user's television set. The LLEO system is not capable of handling large amounts of data, while DBS can manage large data packets with relative ease at relatively low cost. However, DBS systems cannot provide two-way communications with the control center. The LLEO system, on the other hand, is well suited for providing two-way communications and handling small bursty packets of data (typically 6–256 bytes). Accordingly, combining the two networks provides an optimized architecture for delivering large amounts of data to the home, while providing a return path for small packets of data, such as, for example, meter reads, power outage notification, data requests, and the like.

Another mode of operation of the present invention could be as a "hot backup" for users that are currently relying in broadband cable or cellular networks as their primary communications path between the control center 2 and the customer. This feature would be particularly useful in the event of natural disasters or man-made disasters which result in interruption of the primary communications path, such as, for example, downed lines due to storms or earthquakes or unintentionally cut cables, etc. The system may be programmed to monitor the primary communications path, and upon detection of a failure or discontinuity, the system would be programmed to automatically begin operation via the LLEO satellite system described above.

The present invention may also be useful in providing communications between the control center 2 and a hand-held remote device, such as, for example, a laptop computer or integrated e-mail terminal. These hand-held devices may be used by service provider employees, contractors or other authorized personnel to access data from the database 16 anywhere in a given region via a transceiver attached or integrated thereto. These hand-held devices permit keyboard data and command entry and use LCD displays to retrieve and review customer data when in the field without the need for interfacing with local telephone, cable or cellular network infrastructure. This feature is especially useful in remote areas where telephone, cable and cellular service are not available.

Any U.S. patent application or patent referred to herein should be deemed to be incorporated by reference herein in its entirety. While the invention has been described in conjunction with specific embodiments thereof, it is evident that many alternatives, modifications and variations will be apparent to those skilled in the art. Accordingly, the preferred embodiments of the invention, as set forth herein, are intended to be illustrative, not limiting. Various changes may be made without departing from the true spirit and full scope of the invention, as defined in the following claims.

What is claimed is:

1. A programmable gateway for providing a two-way communication path between a control center and a remote user, comprising:

a transceiver for communicating with a low earth orbit (LEO) satellite;

an interface for connecting at least one external device to said gateway, said at least one external device being located at said remote user and being external to said gateway;

a processor for processing data received from said control center or from said at least one external device; and memory for storing said data, said processor being operative to:

receive device data from said at least one external device;

determine whether to immediately transmit said device data to said control center;

transmit said device data to said control center via said LEO satellite in response to a determination to immediately transmit said device data to said control center;

store said device data in said memory in response to a determination not to immediately transmit said device data to said control center; and subsequently transmit said stored device data to said control center via said LEO satellite in response to a predetermined condition.

2. The programmable gateway of claim 1, wherein said predetermined condition comprises one of: a signal received from said control center via said LEO satellite; a predetermined time programmed into said gateway; a predetermined time interval programmed into said gateway; and an alarm or exception condition signal generated by one of said at least one external devices.

3. The programmable gateway of claim 1, wherein said at least one external device is selected from a group comprising utility meters, security monitoring devices, display devices, communications devices, electrical load control devices, power service connect/disconnect relays, power outage detectors, and equipment status monitoring devices.

4. The programmable gateway of claim 1, wherein said processor is further operative to receive programming data from said control center via said LEO satellite and to operate according to said programming data.

5. The programmable gateway of claim 1, wherein said processor is further operative to:
    receive control signals from said control center via said LEO satellite; and
    transmit said control signals to said at least one external device.

6. The programmable gateway of claim 1, wherein said processor is further operative to:
    receive control signal from said control center via said LEO satellite;
    determine which of said at least one external devices should receive said control signal; and
    transmit said control signal to said receiving external device.

7. The programmable gateway of claim 1, further comprising a security circuit for encrypting and decrypting data transmitted between said gateway and said control center.

8. A system for monitoring and controlling a device associated with a user from a control center, said user being remotely located from said control center, comprising:
    a control center for generating control messages for said device and receiving monitoring messages from said device; and
    a programmable gateway connected to said devices and located remotely from said control center, said programmable gateway communicating with said control center via a low earth orbit (LEO) satellite,
    said programmable gateway being operative to:
        receive device data from said device;
        determine whether to immediately transmit said device data to said control center;
        transmit said device data to said control center via said LEO satellite in response to a determination to immediately transmit said device data to said control center;
        store said device data in response to a determination not to immediately transmit said device data to said control center; and
        subsequently transmit said stored device data to said control center via said LEO satellite in response to a predetermined condition.

9. The system of claim 8, wherein said control center is operative to:
    receive data from at least one external device;
    reformat said received data; and
    transmit said reformat data to a remote computer system.

10. The system of claim 8, wherein said predetermined condition comprises one of: a signal received from said control center; a predetermined time programmed into said gateway; a predetermined time interval programmed into said gateway; and an alarm or exception condition signal generated by said device.

11. The system of claim 9, wherein said at least one external device is selected from a group comprising utility meters, security monitoring devices, display devices, communications devices, electrical load control devices, power service connect/disconnect relays, power outage detectors, and equipment status monitoring devices.

12. The system of claim 8, wherein said gateway is further operative to receive programming data from said control center via said LEO satellite and to operate in response to said programming data.

13. The system of claim 8, wherein said gateway is connected to a plurality of external devices, and wherein said gateway is further operative to:
    receive a control signal from said control center via said LEO satellite;
    determine which of said plurality of connected external devices should receive said control signal; and
    transmit said control signal to said receiving connected external device.

14. A method for collecting data from a plurality of remote devices via low earth orbit (LEO) satellite, comprising the steps of:
    generating instructions for a gateway attached to at least one of said remote devices;
    transmitting said instructions to said gateway via said LEO satellite, said instructions indicating when said gateway should provide data collected from said attached remote devices;
    receiving from said gateway said data collected from said attached remote devices;
    processing said received data to provide reformatted data; and
    providing said reformatted data to a subscriber.

15. The method of claim 14, wherein said instructions cause said gateway to immediately provide collected data corresponding to an alarm condition and to store other collected data.

16. The method of claim 15, wherein said instructions further cause said gateway to provide said stored collected data in response to one of: a signal received from a control center; a predetermined time programmed into said gateway; and a predetermined time interval programmed into said gateway.

17. The method of claim 14, where in said plurality of remote devices are selected from a group comprising utility meters, security monitoring devices, display devices, communications devices, electrical load control devices, power service connect/disconnect relays, power outage detectors, and equipment status monitoring devices.

* * * * *